United States Patent [19]
Ott et al.

[11] Patent Number: 5,870,515
[45] Date of Patent: Feb. 9, 1999

[54] RECEPTACLE AND ASSOCIATED METHOD FOR PERMITTING THE SELECTIVE WITHDRAWAL OF A FERRULE

[75] Inventors: Michael J. Ott, Taylorsville; Thomas Theuerkorn, Hickory, both of N.C.

[73] Assignee: Siecor Corporation, Hickory, N.C.

[21] Appl. No.: 1,091

[22] Filed: Dec. 30, 1997

Related U.S. Application Data

[63] Continuation-in-part of Ser. No. 870,667, Jun. 6, 1997.

[51] Int. Cl.[6] ..................................................... G02B 6/38
[52] U.S. Cl. ................................ 385/59; 385/78; 385/60; 385/134; 385/147
[58] Field of Search .................................. 385/59, 60, 66, 385/67, 68, 78, 134, 137

[56] References Cited

U.S. PATENT DOCUMENTS

| | | | |
|---|---|---|---|
| 5,054,879 | 10/1991 | Brown | 385/59 |
| 5,214,730 | 5/1993 | Nagasawa et al. | 385/59 |
| 5,555,332 | 9/1996 | Dean et al. | 385/53 |
| 5,600,748 | 2/1997 | Kosaka | 385/59 |
| 5,689,598 | 11/1997 | Dean, Jr. et al. | 385/59 |

*Primary Examiner*—Hung N. Ngo

[57] ABSTRACT

The receptacle permits selected ones of the ferrules to be withdrawn from the receptacle without disconnecting the fiber optic connector from the receptacle and without disassembling the receptacle. As such, the ferrule that is withdrawn from the receptacle can be disconnected from the corresponding ferrule of the fiber optic connector assembly without disconnecting the other ferrules from the corresponding ferrules of the fiber optic connector assembly.

20 Claims, 9 Drawing Sheets

RECEPTACLE AND ASSOCIATED METHOD FOR PERMITTING THE SELECTIVE WITHDRAWAL OF A FERRULE

CROSS REFERENCE TO RELATED APPLICATION

The present application is a continuation-in-part application of U.S. patent application Ser. No. 08/870,667 entitled Receptacle Having A Rotatable Coupling Nut For Engaging A Fiber Optic Connector Assembly, filed on Jun. 6, 1997 and assigned to Siecor Corporation, the assignee of the present application. The contents of U.S. patent application Ser. No. 08/870,667 are hereby incorporated by reference in their entirety.

FIELD OF THE INVENTION

The present invention relates generally to receptacles for receiving corresponding fiber optic connector assemblies and, more particularly, to receptacles which permit the selective withdrawal of a ferrule following the mating of the receptacle with a fiber optic connector assembly.

BACKGROUND OF THE INVENTION

Optical fibers are used in an increasing number and variety of applications, such as a wide variety of telecommunications and data transmission applications. As a result, fiber optic networks must include an ever increasing number of enclosures in which one or more of the optical fibers are interconnected or otherwise terminated. For example, fiber optic networks, such as cable television (CATV) networks, may include a number of optical network units (ONUs) in which the optical signals propagating along the optical fibers are converted to respective electrical signals. In addition, telephone and CATV networks can include a number of network interface devices (NIDs), one of which is associated with each subscriber. Upon receiving the incoming optical signals, the NID splits and routes the signals to predetermined locations, such as to various telephone or CATV outlets. Like an ONU, the NID can also convert the incoming optical signals to electrical signals, if necessary. Fiber optic networks can also include a number of splice closures in which various ones of the optical fibers are spliced or optically connected.

These enclosures protect the optical fibers, such as from moisture or other forms of environmental degradation. These enclosures also isolate or otherwise protect the optical fibers within the enclosure from strain or torque imparted to a portion of the fiber optic cable outside of the enclosure in order to maintain proper alignment and spacing between the spliced optical fibers and to prevent undesirable signal attenuation.

These enclosures, such as ONUs, NIDs and splice closures, typically include a number of receptacles in which the individual optical fibers of a fiber optic cable are connected to respective optical fibers within the enclosure. The optical fibers within the enclosure can then be interconnected or otherwise terminated as desired. Conventionally, receptacles have included an externally threaded sleeve fixed to and extending outward from the enclosure. In order to provide for interconnection of the optical fibers, a ferrule holder can be disposed within the externally threaded sleeve. The ferrule holder defines one or more openings for receiving respective ferrules and for maintaining the ferrules in a predetermined position relative thereto. The ferrules are, in turn, mounted upon the end portions of one or more optical fibers which extend into the interior of the enclosure.

In order to mate with the receptacle of a conventional enclosure, a fiber optic connector assembly, typically referred to as a plug, is mounted upon the end portion of a fiber optic cable. Typically, the plug includes a generally cylindrical housing and a ferrule holder disposed within the cylindrical housing. The ferrule holder of the plug also defines one or more openings for receiving respective ferrules and for maintaining the ferrule in a predetermined position relative thereto. The ferrules are, in turn, connected to one or more optical fibers of the fiber optic cable such that mating of the plug and the receptacle will align or connect the optical fibers of the fiber optic cable with respective optical fibers within the enclosure.

Following the connection of a plug with a receptacle, it is sometimes desirable to remove certain ones of the ferrules. For example, a ferrule or the optical fibers upon which a ferrule is mounted may be damaged and may need to be replaced. Alternatively, a ferrule may need to be removed in order to clean the ferrule and, more particularly, to clean the end faces of the optical fibers upon which the ferrule is mounted. In instances in which the receptacle was not fully populated with ferrules, it may be desirable to insert additional ferrules into the receptacle so as to establish additional optical connections following connection of the plug with the receptacle.

In order to remove a ferrule or to insert an additional ferrule following the connection of a plug with a conventional receptacle, the plug must first be disconnected, thereby optically disconnecting all of the optical fibers. The receptacle must then be at least partially disassembled in order to access the individual ferrules. Only after disconnecting the plug from the receptacle and at least partially disassembling the receptacle can a technician access one or more of the ferrules in order to make the necessary repair or replacement or to insert an additional ferrule into the receptacle. As will be apparent, the disconnection of the plug from the receptacle and the attendant disconnection of each of the optical fibers can create significant problems in instances in which the optical signals carried by the optical fibers are of vital importance. Even if the optical signals are not of vital importance, the disconnection of all of the optical fibers significantly delays the optical communications including the optical communications supported by the optical fibers that are not being repaired or replaced.

SUMMARY OF THE INVENTION

In order to address at least some of the shortcomings of conventional receptacle and plug designs, the receptacle of the present invention permits selected ones of the ferrules to be withdrawn from the receptacle without disconnecting the fiber optic connector from the receptacle and without disassembling the receptacle. As such, the ferrule that is withdrawn from the receptacle can be disconnected from the corresponding ferrule of the fiber optic connector assembly without disconnecting the other ferrules from the corresponding ferrules of the fiber optic connector assembly.

The receptacle includes a receptacle body adapted to be mounted in a fixed position and extending lengthwise between opposed forward and rear ends. The receptacle also includes a ferrule holder, typically having a cylindrical shape, that is disposed at least partially within the receptacle body. The ferrule holder defines a plurality of openings defining respective lengthwise extending axes. In one advantageous embodiment, the plurality of openings defined by the ferrule holder are circumferentially spaced. Ferrules are disposed within respective ones of the openings defined by the ferrule holder such that the ferrules are exposed through the forward end of the receptacle body for mating with corresponding ferrules of the fiber optic connector assembly. According to the present invention, the receptacle also includes means for withdrawing one of the plurality of ferrules in a rearward direction along the respective lengthwise extending axis from the respective opening defined by the ferrule holder without disassembling the receptacle. As such, the withdrawn ferrule can be disconnected from the corresponding ferrule of the fiber optic connector assembly without disconnecting the other ferrules of the receptacle from the corresponding ferrules of the fiber optic connector assembly.

According to one advantageous embodiment, the withdrawing means is a selector for selecting one of the plurality of openings defined by the ferrule holder from which a ferrule is to be withdrawn. Typically, the selector is disposed rearward of the ferrule holder and is adapted to rotate relative to the ferrule holder. In addition, the selector preferably defines an opening that is at least as large as the size, in lateral cross-section, of the openings defined by the ferrule holder. By rotating the selector relative to the ferrule holder until the opening defined by the selector is aligned with a respective opening defined by the ferrule holder, the ferrule disposed within the respective opening can be withdrawn in a rearward direction without disassembling the receptacle or otherwise disconnecting the other ferrules.

As such, a plurality of ferrules can be inserted in respective ones of the openings defined by the ferrule holder of the receptacle. A fiber optic connector assembly can then be mated with the receptacle such that the plurality of ferrules exposed through the forward end of the receptacle are mated with corresponding ferrules of the fiber optic connector assembly. Thereafter, a selected one of the plurality of ferrules can be withdrawn in a rearward direction from the respective opening defined by the ferrule holder without disassembling the receptacle. Accordingly, the various ferrules housed by the receptacle can be withdrawn, such as for repair, cleaning or replacement, without disconnecting the other ferrules of the receptacle from the corresponding ferrules of the fiber optic connector assembly. Thereafter, a ferrule can be reinserted into the respective opening from which the ferrule was previously withdrawn so as to mate with the corresponding ferrule of the fiber optic connector assembly. In this manner, additional ferrules can be inserted into a receptacle that was not fully populated in order to make additional optical connections, if so desired.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
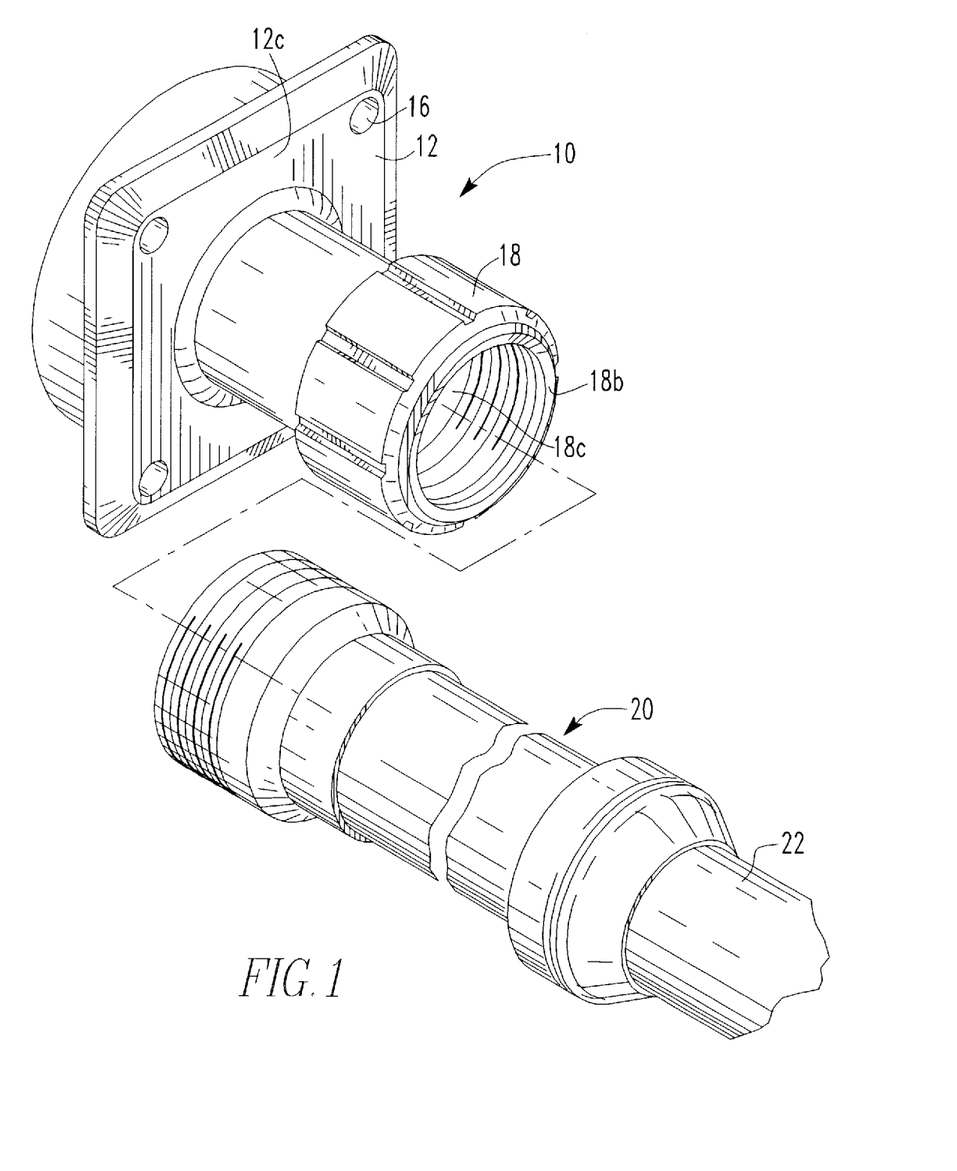
FIG. 1 is a perspective view of a fiber optic cable assembly of one embodiment of the present invention which illustrates a receptacle and a fiber optic connector assembly mounted upon the first end of a fiber optic cable in preparation for connection with the receptacle.
Figure 2:
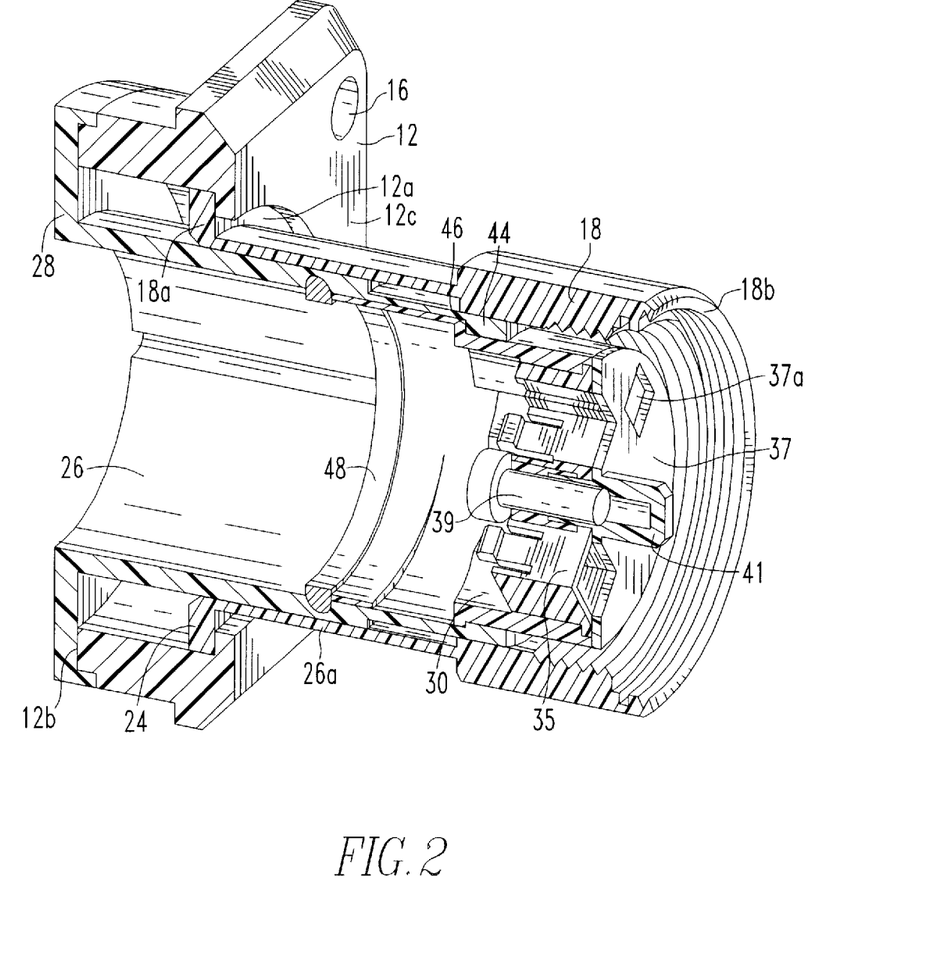
FIG. 2 is a cross-sectional view of one embodiment of the receptacle of FIG. 1.
Figure 3:
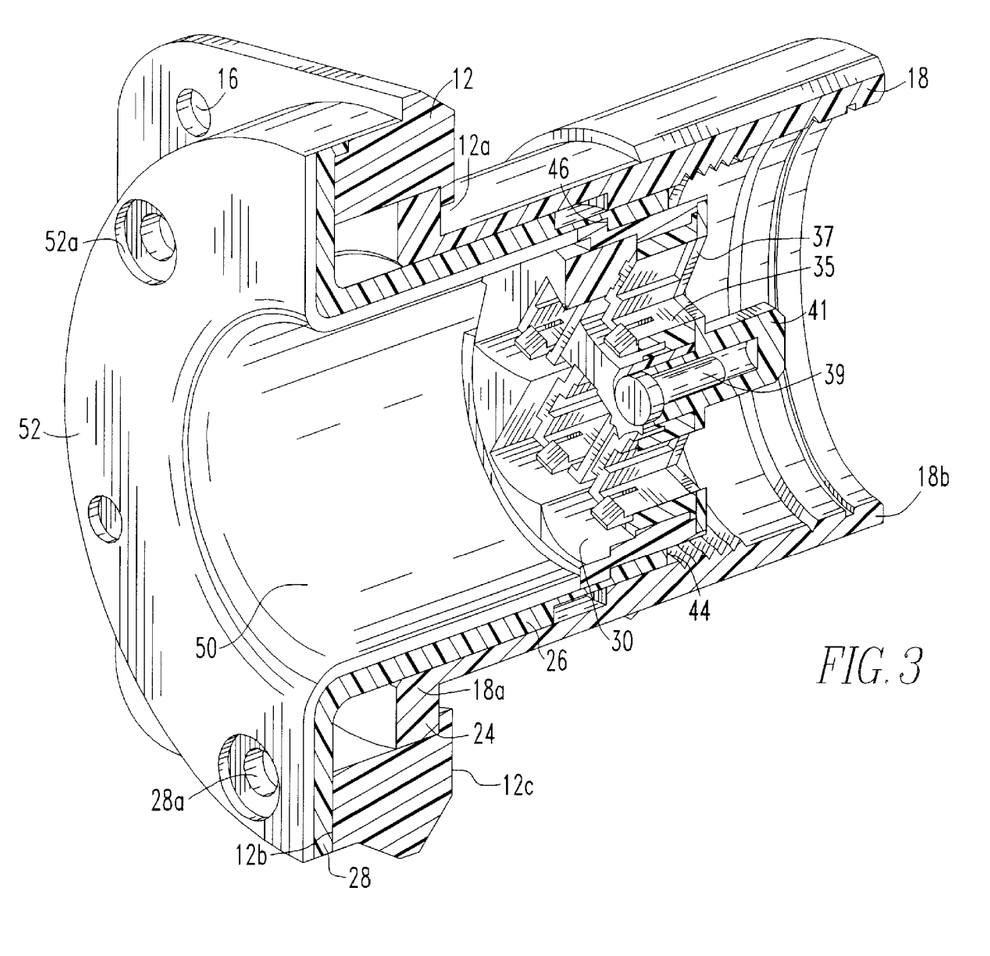
FIG. 3 is a cross-sectional view of another embodiment of the receptacle of FIG. 1.
Figure 5:
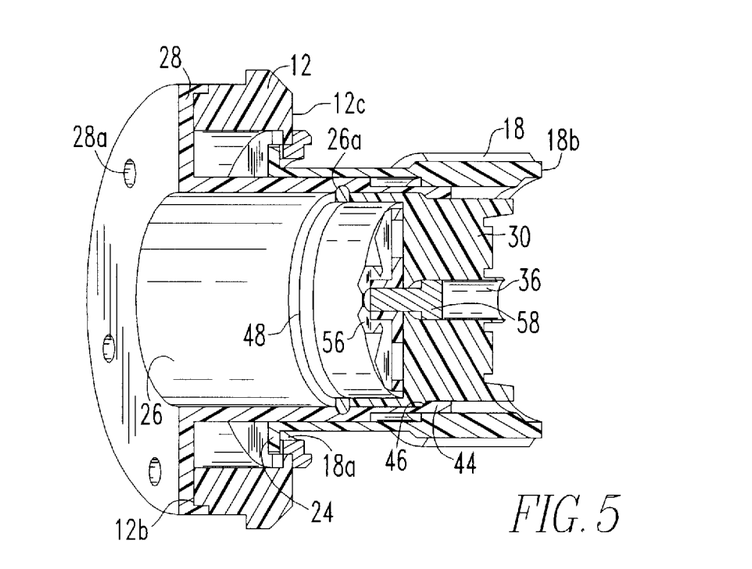
FIG. 5 is a cross-sectional view of a receptacle of another embodiment of the present invention which includes a ferrule holder adapted to receive a plurality of MT multi-fiber ferrules.

As shown in FIG. 1, the receptacle 10 of the present invention includes a receptacle body 12 extending between opposed forward and rear ends and defining an aperture 12a. The receptacle body is generally adapted to be mounted in a fixed position, such as to a sidewall or other portion of an enclosure such as an ONU, NID or a splice closure, to thereby define an input port of the enclosure. Although the receptacle body can be mounted to the enclosure in a variety of manners, the receptacle body of the illustrated embodiment includes several openings 16 through which connectors or fasteners can extend for engaging the sidewall or other portion of the enclosure. The receptacle of one advantageous embodiment also includes a coupling nut 18 which cooperably engages the receptacle body such that the coupling nut is free to rotate relative to the receptacle body even though the longitudinal movement of the coupling nut relative to the receptacle body is limited, as described below. The coupling nut extends between a rear end 18a and an opposed forward end 18b and defines a longitudinally extending bore 18c. As shown in FIGS. 2, 3 and 5, the longitudinally extending bore of the coupling nut is aligned with the aperture defined by the receptacle body.

As described below, the coupling nut 18 receives at least a portion of a fiber optic connector assembly 20 (hereinafter referred to as a plug) mounted upon the end portion of a fiber optic cable 22. In this regard, several advantageous fiber optic connector assemblies or plugs which could readily mate with the receptacle 10 of the present invention are described in detail in U.S. patent application Ser. No. 08/870,666, entitled "Flexible Connector Assembly Having Slack Storage", filed concurrently herewith and assigned to the assignee of the present invention, the contents of which are incorporated by reference herein.

The fiber optic cable 22 upon which the plug 20 is mounted can include a single central buffer tube having one or more optical fibers or, alternatively, one or more optical fiber ribbons that each include a predetermined number of optical fibers. Alternatively, the fiber optic cable assembly can include other types of fiber optic cables, such as a fiber optic cable including a number of buffer tubes stranded about a central support member, without departing from the spirit and scope of the present invention. Regardless of the number and configuration of the buffer tubes, the fiber optic cable also generally includes a strength member surrounding or extending alongside the buffer tubes and a protective jacket surrounding the buffer tubes and the strength member.

The coupling nut 18 is at least partially internally threaded. In addition, the longitudinally extending bore 18c defined by the coupling nut is sized such that the plug 20 can be received through the forward end 18b of the coupling nut. The plug is preferably externally threaded such that rotation of the coupling nut relative to the plug threadably engages the plug. As such, a secure mechanical engagement is established between the receptacle 10 and the plug and, more particularly, between the enclosure to which the receptacle is mounted and the fiber optic cable 22 on which the fiber optic assembly is mounted. As shown in FIG. 1, the receptacle can also include an annular seal, typically formed of commercially available O-ring, disposed within the longitudinally extending bore and adjacent the forward end of the coupling nut for insuring a tight seal with the plug. Although the threaded engagement of the coupling nut and the plug provides a secure mechanical engagement therebetween, the plug can be disengaged from the receptacle by rotating the coupling nut in the opposite direction relative to the plug.

The coupling nut 18 can cooperably engage the receptacle body 12 in a variety of fashions without departing from the spirit and scope of the present invention. In the illustrated embodiment, however, the coupling nut extends through the aperture 12a defined by the receptacle body. The coupling nut of this embodiment includes a flange 24 extending radially outward from a rear end 18a of the coupling nut. As illustrated, the outer diameter of the flange is larger than the diameter of the aperture defined by the receptacle body such that the flange engages a rear surface 12b of the receptacle body as the coupling nut is moved in a forward direction, thereby limiting longitudinal movement of the coupling nut in the forward direction relative to the receptacle body.

The receptacle 10 can also include an inner sleeve 26. The inner sleeve extends through the rear end 18a of the coupling nut 18 and at least partially through the longitudinally extending bore 18c of the coupling nut. As illustrated in FIGS. 2, 3 and 5, a forward portion of the coupling nut extends beyond the inner sleeve and is internally threaded for threadably engaging the plug 20. The inner sleeve includes a flanged rear portion 28. The flanged rear portion of the inner sleeve is connected to a portion of the receptacle rearward of the rear end of the coupling nut. Although the flanged rear portion of the inner sleeve can be connected to the receptacle body in a variety of fashions, the flanged rear portion of one embodiment includes a number of openings 28a through which respective connectors or fasteners can extend for engaging the receptacle body 12. As a result of the connection of the flanged rear portion of the inner sleeve to the receptacle body at a location rearward of the rear end of the coupling nut, the flanged rear portion of the inner sleeve limits longitudinal movement of the coupling nut in a rearward direction relative to the receptacle body.

As shown in FIGS. 2, 3 and 5, the receptacle body 12 of one embodiment defines a generally cylindrical aperture 12a having a stepped diameter. In particular, the portion of the cylindrical aperture adjacent the front surface 12c of the receptacle body has a smaller diameter than the portion of the cylindrical aperture adjacent the rear surface 12b of the receptacle body. In order to cooperably engage the coupling nut, the diameter of the portion of the cylindrical aperture adjacent the front surface of the receptacle body is less than the diameter of the flange 24 extending radially outward from the rear end 18a of the coupling nut 18. However, the diameter of the portion of the cylindrical opening adjacent the rear surface of the receptacle body equals or exceeds the diameter of the flange extending radially outward from the rear end of the coupling nut. Thus, the receptacle body and the inner sleeve 26 cooperate to define an annular pocket or window within which the flange extending radially outward from the rear end of the coupling nut can move in a longitudinal direction with the forward movement of the coupling nut limited by the receptacle body and the rearward movement of the coupling nut limited by the flanged rear portion 28 of the inner sleeve.

The receptacle 10 also includes a ferrule holder 30 disposed within the longitudinally extending bore 18c defined by the coupling nut 18. As shown in FIGS. 2 and 3, the ferrule holder defines a number of openings 32 for receiving respective ferrules 34. Typically, the openings are lengthwise extending passageways defining respective lengthwise extending axes. The openings in the ferrule holder are sized and shaped to receive the ferrules and to maintain the ferrules in respective predetermined positions relative to the ferrule holder and, in turn, relative to the receptacle. The ferrules can include single fiber ferrules that are mounted upon the end portions of respective optical fibers. Alternatively, the ferrules can include multi-fiber ferrules, such as the MT ferrules shown in FIG. 6, mounted on the end portions of respective ones of the optical fibers. For example, the multi-fiber ferrules mounted upon the end portions of respective fiber optic ribbons.

Figure 6:
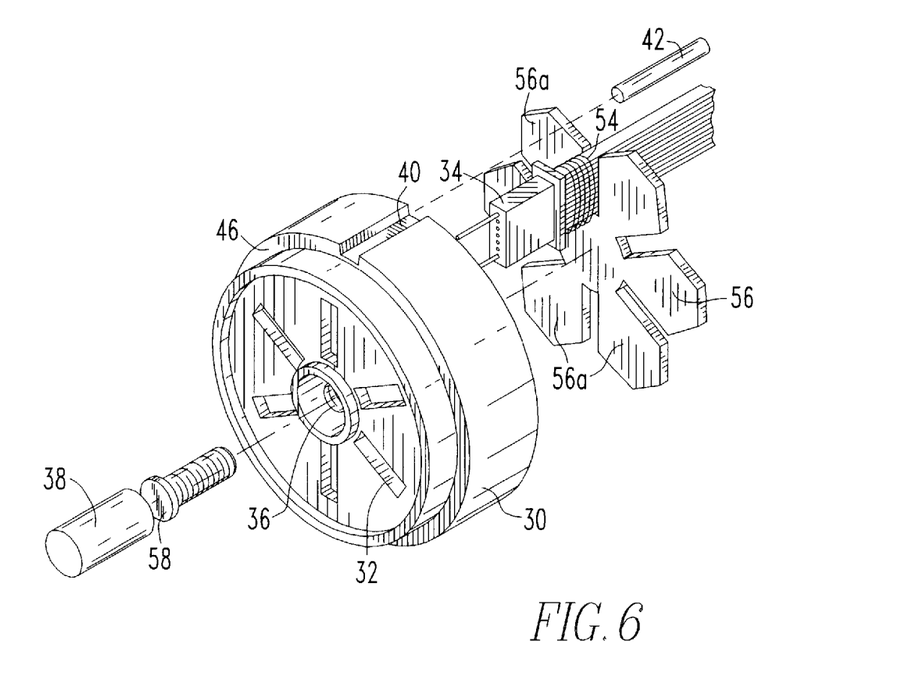
FIG. 6 is an exploded perspective view of the ferrule holder of FIG. 5 which is adapted to receive a plurality of MT multi-fiber ferrules.

The receptacle 10 can include a variety of ferrule holders 30 without departing from the spirit and scope of the present invention. As illustrated in FIGS. 5 and 6, however, the ferrule holder of one advantageous embodiment is adapted to receive and hold a number of multi-fiber ferrules 34, such as MT ferrules, in respective predetermined positions. For example, the ferrule holder of this embodiment can have a cylindrical shape and can hold six or twelve MT ferrules spaced circumferentially in equal angular increments.

Figure 4:
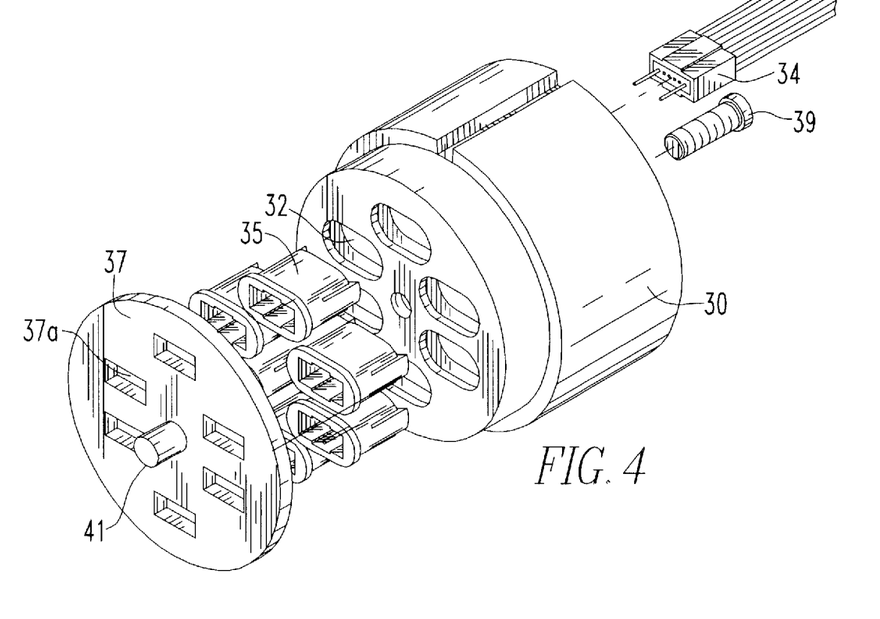
FIG. 4 is an exploded perspective view of a ferrule holder of one advantageous embodiment which is adapted to receive a plurality of MTP connectors, each of which includes a respective MT multi-fiber ferrule.

Alternatively, the ferrule holder 30 can be designed to receive fully connectorized optical fibers. In this embodiment, the ferrule holder can define openings 32 that have been sized and shaped to receive ferrule sleeves 35 which, in turn, receive ferrules 34 that have already been mounted within a connector housing. As shown in FIGS. 2–4, for example, the ferrule holder has six ferrule sleeves and is therefore adapted to receive six MTP connectors, each of which includes a respective MT ferrule mounted upon the end portion of a fiber optic ribbon. See U.S. Pat. No. 5,214,730 for a description of MT ferrules and MTP connectors.

As also shown in FIGS. 2–4, a ferrule sleeve holder 37 can be attached to the forward surface of the ferrule holder 30, such as by means of a bolt or other connector 39 extending from the rear through a centrally located aperture 36 of the ferrule holder. The ferrule sleeve holder defines a number of openings 37a equal to the number of openings 32 defined by the ferrule holder. The openings defined by the ferrule sleeve holder are aligned with the openings defined by the ferrule holder and, in turn, are aligned with respective ones of the ferrule sleeves 35. In addition, the openings defined by the ferrule sleeve holder generally correspond in shape and size to the openings defined by the ferrule holder. However, the openings defined by the ferrule sleeve holder are slightly smaller than the forward end of the ferrule sleeves such that the ferrule sleeve holder effectively secures the ferrule sleeves within the corresponding openings defined by the ferrule holder.

As described above, the embodiment of the ferrule holder 30 illustrated in FIGS. 2 and 3 is adapted to receive MTP connectors that have been mounted upon the end portions of respective fiber optic ribbons. As such, the MTP connectors can be inserted into the respective openings 32 defined by the ferrule holder by inserting an MTP connector through the rear end of the receptacle body 12 and into a respective opening defined by the ferrule body. The receptacle 10 preferably includes means for retaining the connectors within the respective openings. As shown in FIGS. 2 and 3, for example, ferrule sleeves 35 have previously been inserted into the openings defined by the ferrule holder. Each ferrule holder includes a pair of latch arms that serve as the retaining means by engaging recessed portions defined by opposite sides of the MTP connector so as to engage in the MTP connector and to hold the MTP connector within the respective opening.

Although the latch arms of the ferrule sleeves 35 serve as the retaining means in the above-described embodiment, the receptacle can include a variety of retaining means without departing from the spirit and scope of the present invention. For example, in another embodiment illustrated in FIGS. 5 and 6 in which the ferrule holders 30 is adapted to receive a plurality of MT multi-fiber ferrules, the retaining means can include a plurality of springs 54, one of which is associated with and engages the rear surface of each ferrule. As such, the springs bias the ferrules outwardly toward the forward end of the receptacle body 12. The ferrule holder can also include a spring plate 56 disposed within the receptacle body. As illustrated in FIGS. 5 and 6, the spring plate is preferably attached to the rear of the ferrule holder, such as by means of a bolt 58 having a head portion that is retained at least partially within the centrally located opening 36 and a shank portion which threadably engages a threaded aperture defined by the spring plate. According to one advantageous embodiment, the spring plate includes a number of radially extending arms 56a. As shown, the optical fibers extend between the radial arms of the spring plate, while the springs press against one or more of the radial arms. Thus, the springs urge the plurality of ferrules outwardly toward the forward end of the coupling nut 18.

According to the illustrated embodiment, the inner sleeve 26 serves to retain the ferrule holder 30 within the receptacle 10 by limiting movement of the ferrule holder in the forward direction through the receptacle body 12. In this regard, the ferrule holder has a stepped outer diameter including a portion adjacent the rear surface of the ferrule holder which has a larger diameter than the forward portion of the ferrule holder. As illustrated in FIGS. 2, 3 and 5, the forward end of the inner sleeve preferably defines a lip or rib 44 extending radially inward. The radially inwardly extending lip engages a shoulder 46 defined by the stepped exterior diameter of the ferrule holder to thereby limit forward longitudinal movement of the ferrule holder. Although not illustrated, the coupling nut 18, instead of the inner sleeve, could include a lip or rib which extends radially inward in order to limit the forward longitudinal movement of the ferrule holder without departing from the spirit and scope of the present invention.

The longitudinal movement of the ferrule holder 30 in a rearward direction is also limited by the receptacle 10 of the present invention. According to a first embodiment shown in FIG. 2, the interior surface of the inner sleeve 26 defines a circumferential groove 26a in which a retaining ring 48, such as a slip ring, is disposed. The retaining ring abuts the rear portion of the ferrule holder so as to limit longitudinal movement of the ferrule holder in a rearward direction. Alternatively, the receptacle can further include a retaining sleeve 50 extending at least partially through the inner sleeve from a rear end thereof. In the embodiment illustrated in FIG. 3, the retaining sleeve also includes a flanged rear portion 52 defining a number of openings 52a through which connectors or fasteners extend for connecting the retaining sleeve to the flanged rear portion 28 of the inner sleeve and, in turn, to the receptacle body 12. However, the retaining sleeve can be attached to the inner sleeve and/or the receptacle body in a variety of other fashions without departing from the spirit and scope of the present invention. As illustrated in FIG. 3, the retaining sleeve abuts a rear portion of the ferrule holder so as to limit longitudinal movement of the ferrule holder in a rearward direction.

According to either embodiment, the ferrule holder 30 is therefore held within the receptacle body 12 such that the optical fibers upon which the ferrules are mounted are exposed through the forward end of the receptacle body. As such, the ferrules 34 and, in turn, the optical fibers upon which the ferrules are mounted are aligned and interconnected with the ferrules and, in turn, the optical fibers of the plug 20 upon engagement of the plug by the coupling nut 18 of the receptacle 10 of the present invention.

In this regard, the ferrule holder 30 of one embodiment defines a centrally located opening 36 for receiving and frictionally engaging an alignment member 38. See FIGS. 5 and 6. The alignment member is generally a post that extends outwardly from the front face of the ferrule holder for engaging a corresponding opening defined by the ferrule holder of the plug 20, thereby facilitating alignment and interconnection of the optical fibers within the enclosure with respective optical fibers of the fiber optic cable 22. Instead of a centrally located opening, the ferrule holder or the ferrule sleeve holder 37 of an alternative embodiment shown in FIGS. 2–4 can include an outwardly extending alignment pin 41 for engaging a corresponding opening defined by the ferrule holder of the plug and for facilitating alignment and interconnection of the respective optical fibers. The outwardly extending alignment member or alignment pin can also include a longitudinal groove, rib or other alignment feature for engaging a corresponding alignment feature within the centrally located opening(s) defined by the ferrule holder(s), thereby insuring that the ferrule holders are also angularly or rotationally aligned. However, the receptacle 10 can include other means for aligning the ferrule holder and, in turn, the ferrules with the ferrule holder of the plug without departing from the spirit and scope of the present invention. For example, the outer surface of the ferrule holder can define a lengthwise extending groove 40 for receiving one end of an alignment pin 42 that serves to align the ferrule holder, such as with a ferrule holder disposed within the plug. See FIG. 6.

Once the receptacle 10 and the plug 20 have been mated, it is sometimes desirable to remove one or more of the ferrules, i.e., MT ferrules, or one or more of the connectors, i.e., MTP connectors, such as for repair, cleaning or replacement. Hereinafter, the ferrules and the connectors mounted upon the end portions of the optical fibers will be referred to as ferrules. According to the present invention, the receptacle includes means for withdrawing a selected one of the plurality of ferrules from the respective opening 32 defined by the ferrule holder 30 by withdrawing the ferrule in a rearward direction along the respective lengthwise extending axis defined by the opening. As such, the selected one of the plurality of ferrules can be withdrawn without disassembling the receptacle. Accordingly, the withdrawn ferrule can be disconnected from the corresponding ferrule of the fiber optic connector assembly, i.e., plug, without disconnecting the other ferrules of the receptacle from the corresponding ferrules of the fiber optic connector assembly. Thereafter, the ferrule can be cleaned, repaired or replaced prior to being reinserted through the rear end of the receptacle body 12 and into the respective opening defined by the ferrule holder.

Figure 7:
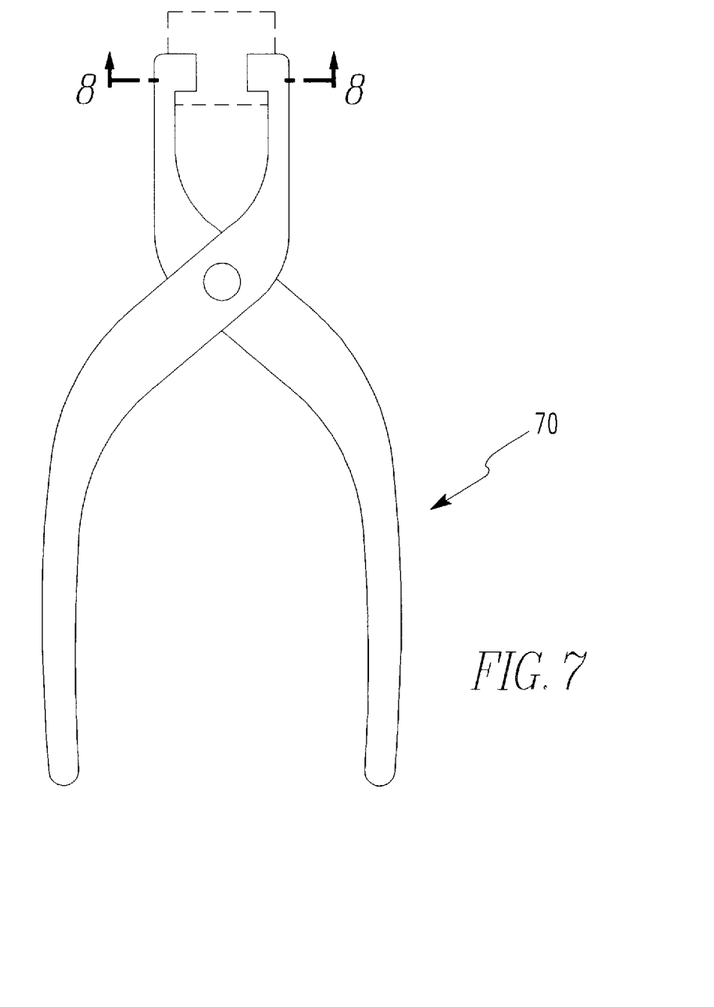
FIG. 7 is a plan view of a tool utilized to withdraw ferrules from the openings defined by the ferrule holder of the embodiment of the receptacle illustrated in FIGS. 2 and 3.
Figure 8:
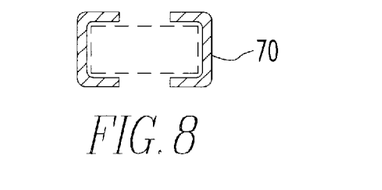
FIG. 8 is an end view of the tool of FIG. 7 which is sized and shape to grasp the ferrules disposed within the openings defined by the ferrule holder of the embodiment of the receptacle illustrated in FIGS. 2 and 3.

In the embodiment illustrated in FIGS. 2 and 3, the withdrawing means includes means for disengaging the latch arms of the ferrule sleeve 35 so as to disengage the MTP connector from the respective ferrule sleeve. Thereafter, the MTP connector can be withdrawn in a rearward direction without disassembling the receptacle 10 and without disconnecting any of the other ferrules. In order to disengage the latch arms from the respective MTP connector, a tool 70 as shown in FIGS. 7 and 8 has been developed. The tool has the general appearance of a pair of pliers and includes a pair of relatively long arms which can extend through the rear end of the receptacle body 12 in order to grasp the MTP connector. In this regard, the end portions of the arms have a generally U-shape that is sized to correspond with and engage the outer housing of an MTP connector. See FIGS. 7 and 8 in which an MTP connector is illustrated in dashed lines.

Since an MTP connector is a push-pull connector as known to those skilled in the art and as described by U.S. Pat. No. 5,214,730, the MTP connector can be disengaged by pulling the outer housing or slider rearward relative to the remainder of the MTP connector. This rearward movement of the outer housing relative to the remainder of the MTP connector disengages the latch arms from the corresponding recesses in the opposed sides of the MTP connector and permits the MTP connector to be rearwardly withdrawn from the respective opening 32 defined by the ferrule holder 30. Although the tool 70 of FIGS. 7 and 8 is particularly advantageous for withdrawing MTP connectors as described above, the withdrawing means can include other tools for selectively withdrawing other types of ferrules or connectors from openings defined by the ferrule holder without departing from the spirit and scope of the present invention. In addition, the tool is also useful for inserting the ferrules through the rear end of the receptacle and into the respective opening defined by the ferrule holder.

Figure 9:
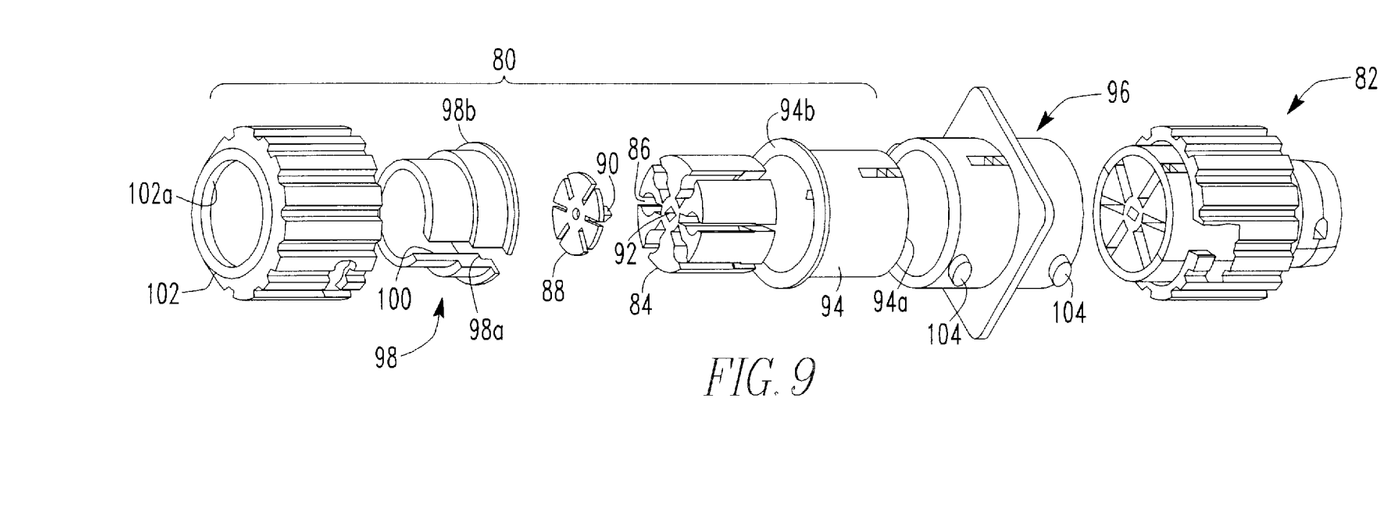
FIG. 9 is an exploded perspective view of a receptacle according to another embodiment of the present invention in preparation for mating with a fiber optic connector assembly via an interconnect sleeve.

FIG. 9 illustrates a receptacle 80 of another embodiment that permits a selected one of a plurality of ferrules to be withdrawn from the receptacle without disassembling the receptacle or otherwise disconnecting the other ferrules from corresponding ferrules of the fiber optic connector assembly 82. The receptacle of this embodiment also includes a ferrule holder 84 defining a plurality of openings 86 for receiving ferrules. In the illustrated embodiment, the ferrule holder is cylindrical and defines a number of circumferentially spaced openings for receiving respective ferrules. As shown, the openings are preferably lengthwise extending passageways that define respective lengthwise extending axes.

Figure 10:
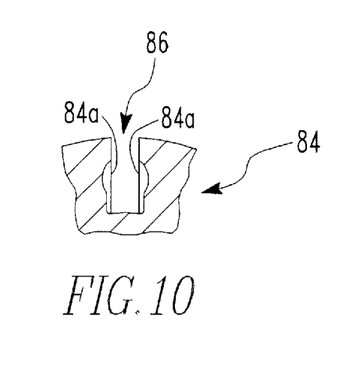
FIG. 10 is a fragmentary cross-sectional view of a portion of the ferrule holder of the receptacle of FIG. 9 which illustrates the lengthwise extending passageways defined by the ferrule holder.

While the openings 86 defined by the ferrule holder 84 open through the lateral or side surface of the ferrule holder as well as the opposed forward and rear ends of the ferrule holder as shown in FIG. 10, the openings are preferably sized and shaped such that ferrules can only be inserted and withdrawn through the rear end of the ferrule holder. In order to permit the ferrule to be removed in a rearward direction from the respective opening defined by the ferrule holder, those portions of the openings defined by the ferrule holder that extend rearward of the ferrule must be at least as large, in lateral cross-section, as the respective ferrules. In addition, the ferrule holder preferably includes shoulder surfaces 84a adjacent the forward end of the ferrule holder that extend into the respective openings for engaging the enlarged rear portion of the ferrule, such as the enlarged rear portion of an MT ferrule, in order to prevent the ferrule from being removed through the forward end of the ferrule holder. Nonetheless, the ferrule holder permits the front face of the ferrule to be exposed through the forward end of the ferrule holder such that the ferrule can be mated with a corresponding ferrule of the fiber optic connector assembly 82.

As described above in conjunction with FIGS. 5 and 6, the retaining means can include springs disposed within respective ones of the openings 86 defined by the ferrule holder 84 for operably engaging the rear surface of the respective ferrules so as to urge the ferrules forwardly within the openings defined by the ferrule holder. In order to retain both the ferrules and the springs within the respective openings, the retaining means of this embodiment of the receptacle also preferably include a spring plate 88 disposed adjacent the rear end of the ferrule holder. As shown, the spring plate can include an outwardly extending post 90 that is inserted within and frictionally engages a bore 92 defined by the ferrule holder, thereby effectively securing the ferrule and the springs within the respective openings.

The receptacle 80 of this embodiment also includes a receptacle body that includes a tubular sleeve member 94 that extends between opposed forward and rear ends. The ferrule holder 84 is at least partially disposed within the tubular sleeve member. In order to prevent the ferrule holder from being removed through the forward end of the receptacle, the forward end of the tubular sleeve member preferably includes an inwardly extending shoulder surface 94a for circumferentially engaging peripheral portions of the forward end of the ferrule holder. In addition, the rear end of the tubular sleeve member preferably includes an outwardly extending circumferential flange 94b for facilitating insertion of the receptacle into an interconnect sleeve 96, as described hereinbelow.

Figure 11:
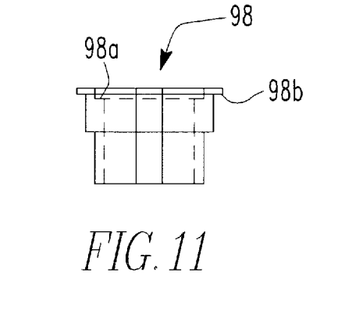
FIG. 11 is a plan view of the selector of the receptacle in FIG. 9.

The receptacle 80 of this embodiment of the present invention also includes withdrawing means, preferably embodied by a selector 98 disposed rearward of the ferrule holder 84 for selecting one of the plurality of openings 86 defined by the ferrule holder from which a ferrule is to be withdrawn. As shown in FIGS. 9 and 11, the selector can include a second tubular sleeve member that is adapted to engage the rear end of the ferrule holder. In this embodiment, the forward end of the selector preferably includes an inwardly extending shoulder 98a surface for circumferentially engaging peripheral portions of the rear end of the ferrule holder. As will be described hereinafter, the forward end of the selector also preferably includes an outwardly extending flange 98b.

The selector 98 preferably includes an opening 100, such as a slot, that extends through the shoulder surface 98a that otherwise engages peripheral portions of the rear end of the ferrule holder 84. By rotating the selector relative to the ferrule holder and aligning the opening defined by the selector with a respective one of the openings 86 defined by the ferrule holder, the ferrule can be removed in a rearward direction from the selected opening.

As shown, the receptacle 80 of this embodiment also includes an outer coupling shroud 102 in which the ferrule holder 84, the tubular sleeve member 94 and the selector 98 are all at least partially disposed. In this regard, the rear end of the outer coupling shroud preferably defines an inwardly extending flange 102a for engaging the flange 98b extending outwardly from the forward end of the selector. As such, rear portions of the selector extend through the opening in the rear end of the outer coupling shroud such that a technician can grasp the selector and can rotate the selector relative to the ferrule holder in order to align the opening 100 defined by the selector with a particular opening 86 defined by the ferrule holder. In addition, the forward ends of the tubular sleeve member and the ferrule holder preferably extend through the forward end of the outer coupling shroud in order to mate with the corresponding fiber optic connector assembly 82.

Although the receptacle 80 of the illustrated embodiment does not include a coupling nut, the receptacle is adapted to be inserted within and mechanically engage an interconnect sleeve 96 that typically extends through a wall or other surface. In order to mechanically engage the interconnect sleeve, the opposed sides of the outer coupling shroud 102 preferably define respective L-shaped openings for engaging respective posts 104 that extend outwardly from the interconnect sleeve, thereby providing a bayonet-type connection. While the forward end of the tubular sleeve member 94 and the ferrule holder 84 are inserted into the interconnect sleeve, the flange 94b that extends outwardly from the rear end of the tubular sleeve member preferably engages the interconnect sleeve and prevents the tubular sleeve member and the ferrule holder from being extended completely through the interconnect sleeve.

In order to withdraw a ferrule from a respective opening 86 defined by the ferrule holder 84 once the receptacle 80 has been mated with a corresponding plug 82, the selector 98 is initially rotated relative to the ferrule holder until the opening 100 defined by the selector is aligned with the opening defined by the ferrule holder in which the ferrule to be withdrawn is disposed. Thereafter, the spring plate 88 is removed and the ferrule is removed in a rearward direction from the opening defined by the ferrule holder. As will be apparent, the opening defined by the selector must be at least as large as the size, in lateral cross-section, of the openings defined by the ferrule holder. While the opening defined by the selector permits the ferrule to be removed from the selected opening, the inwardly extending shoulder 98a of the selector covers at least a portion of each of the other openings defined by the ferrule holder such that none of the other ferrules can be removed even after the spring holder has been removed. Thus, a selected one of the ferrules can be withdrawn without disassembling the receptacle or otherwise disconnecting the other ferrules within the receptacle from corresponding ferrules of the fiber optic connector assembly.

In order to reinsert a ferrule, such as following its cleaning, repair or replacement, the ferrule is inserted through the aperture defined by the rear end of the outer coupling shroud 102 and into the respective opening 86 defined by the ferrule holder 84. Thereafter, the spring holder is replaced such that proper optical connection is maintained between each of the corresponding ferrules of the receptacle 80 and fiber optic connector assembly 82, including the newly reinserted ferrule.

Figure 12:
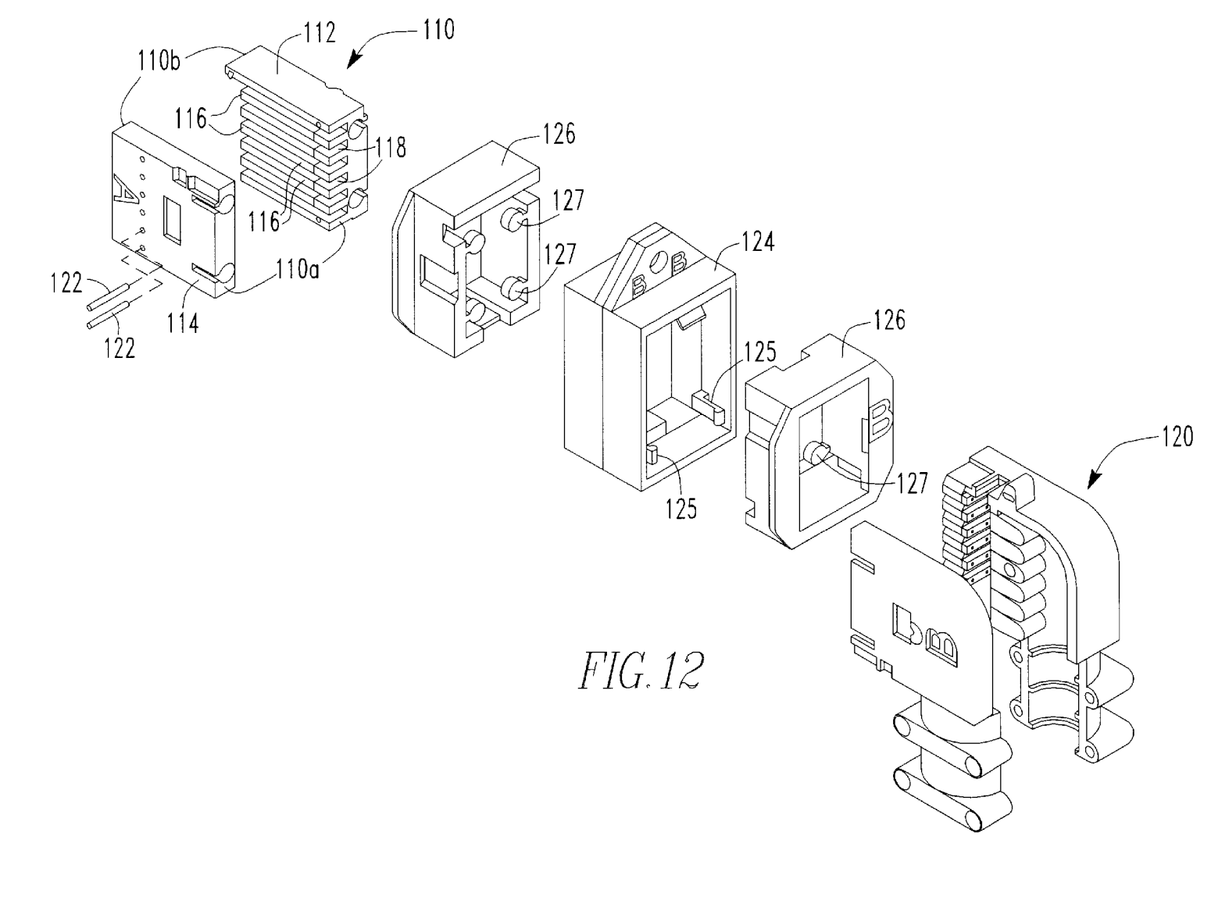
FIG. 12 is an exploded perspective view of a receptacle and a corresponding fiber optic connector assembly according to yet another embodiment of the present invention.
Figure 13A:
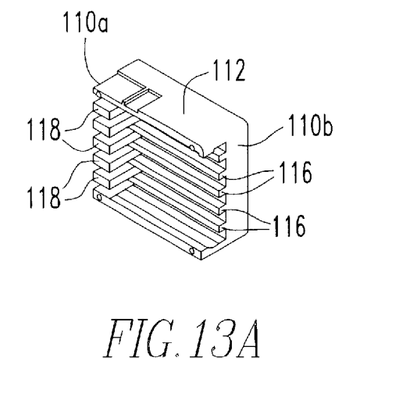
FIGS. 13a and 13b are perspective views of the first and second portions of the receptacle body of the receptacle of FIG. 12.
Figure 13B:
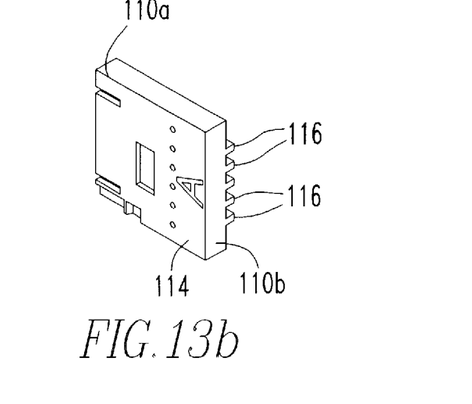
Figure 14A:
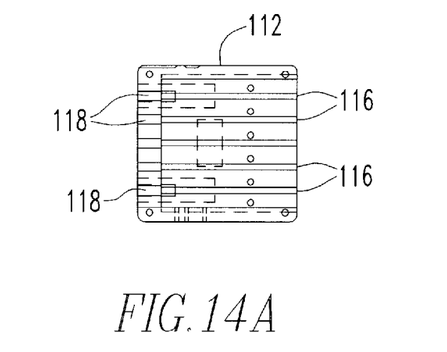
FIGS. 14a and 14b are top views of the first and second portions of the receptacle body illustrated in FIGS. 13a and 13b, respectively.
Figure 14B:
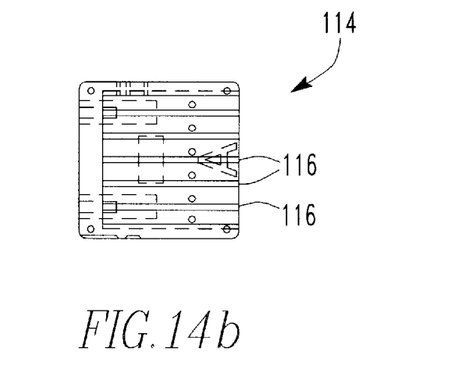

The receptacle 110 of yet another embodiment of the present invention is illustrated in FIGS. 12–14. The receptacle of this embodiment includes a receptacle body that includes first and second portions 112, 114 that cooperate to define an internal cavity. The first and second portions of the receptacle body also cooperate to define a number of lengthwise extending channels. Each channel opens through both the front face 110a of the receptacle body and the rear face 110b of the receptacle body and are separated from other channels by lengthwise extending walls 116. As such, ferrules mounted upon the end portions of respective optical fibers can be inserted into respective channels through the rear end of the receptacle body.

In order to retain the ferrules within the receptacle body, the first and second portions 112, 114 of the receptacle body preferably cooperate to define shoulder surfaces 118 that extend into each of the channels proximate the front face 110a of the receptacle for engaging the enlarged rear portion of a respective ferrule. Thus, even though the ferrules are exposed through the openings defined in the front face of the receptacle body, the ferrules are prevented from being removed through the front face of the receptacle body. In order to further urge the ferrules toward the front face of the receptacle body, a spring is preferably disposed rearward of and immediately adjacent to each respective ferrule for applying a bias force for urging the respective ferrule toward the front face of the receptacle body in preparation for mating with corresponding ferrules of the fiber optic connector assembly 120. In order to prevent the ferrules and springs from being removed through the rear end of the receptacle body, the receptacle preferably includes a plurality of pins 122 that extend through a side wall of at least one of the first and second portions of the receptacle body and into each of the channels defined therein. Each pin extends through a channel at a position rearward of the respective ferrule and spring, thereby preventing the spring and the ferrule from being inadvertently withdrawn from the receptacle body.

Once assembled, the receptacle 110 can be inserted into an interconnect sleeve 124 in order to establish optical interconnection with a fiber optic connector assembly 120 that has been mounted upon the end portions of a plurality of optical fibers. Although the fiber optical connector assembly can be embodied in many different manners, the fiber optic connector assembly of one advantageous embodiment is also illustrated in FIG. 12. Likewise, the interconnect sleeve can be formed in a variety of fashions without departing from the spirit and scope of the present invention. However, according to one embodiment, the interconnect sleeve defines a generally rectangular cavity that opens through both opposed ends. As shown in FIG. 12, outer shrouds 126 can be inserted through the opposed ends of the interconnect sleeve to receive and align the receptacle body and the fiber optic connector assembly such that the receptacle and the fiber optic connector assembly can be appropriately mated. In this regard, the interconnect sleeve includes a number of latches 125 for engaging the outer shrouds which, in turn, include a number of tabs 127 which engage corresponding openings defined by the receptacle and the fiber optic connector assembly.

As described above in conjunction with the other embodiments of the present invention, this embodiment of the receptacle also includes withdrawing means, typically embodied by the pins 122. Once the receptacle 110 and the fiber optic connector assembly 120 have been mated, a selected one of the ferrules of the receptacle can be removed, such as for cleaning, repair or replacement. In order to remove a selected one of the ferrules, the pin 122 that extends through the channel within which the selected ferrule is disposed is removed such that the ferrule can be withdrawn in a rearward direction through the channel and through the rear end of the receptacle. Thereafter, such as following cleaning, repair or replacement of the ferrule, the ferrule can be reinserted through the channel so as to be exposed through the forward end of the receptacle and mated with a corresponding ferrule of the fiber optic connector assembly. The pin can then be inserted through a side wall of the receptacle and into the corresponding channel within which the ferrule is disposed in order to secure the ferrule therein.

As described and illustrated in conjunction with various embodiments of the receptacle of the present invention, the receptacle permits selected ones of the plurality of ferrules to be withdrawn in a rearward direction from a respective opening defined by the ferrule holder with disassembling the receptacle. As such, the withdrawn ferrule can be disconnected from the corresponding ferrule of the fiber optic connector assembly without disconnecting the other ferrules of the receptacle from the corresponding ferrules of the fiber optic connector assembly. Thus, the other ferrules of the receptacle and the corresponding ferrules of the fiber optic connector assembly can continue to transmit optical signals without interruption even as the selected ferrule is withdrawn from the receptacle, such as for cleaning, repair or replacement. Thereafter, the ferrule can be reinserted into the corresponding opening defined by the ferrule holder in order to reestablish optical communications with the corresponding ferrule of the fiber optic connector assembly.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A receptacle for receiving a fiber optic connector assembly, the receptacle comprising:

a receptacle body adapted to be mounted in a fixed position, said receptacle body extending lengthwise between opposed forward and rear ends;

a ferrule holder disposed at least partially within said receptacle body, said ferrule holder defining a plurality of openings defining respective lengthwise extending axes;

a plurality of ferrules engaged within respective ones of the openings defined by said ferrule holder such that said ferrules are exposed through the forward end of said receptacle body for mating with corresponding ferrules of the fiber optic connector assembly; and means for withdrawing one of said plurality of ferrules in a rearward direction along the respective lengthwise extending axis from the respective opening defined by said ferrule holder without disassembling the receptacle such that said withdrawn ferrule can be disconnected from the corresponding ferrule of the fiber optic connector assembly without disconnecting the other ferrules from the corresponding ferrules of the fiber optic connector assembly.

2. A receptacle according to claim 1 wherein said withdrawing means comprises a selector disposed rearward of said ferrule holder, said selector defining an opening that is at least as large as the size, in lateral cross-section, of the openings defined by said ferrule holder such that alignment of the opening defined by said selector with a respective opening defined by said ferrule holder permits the ferrule disposed within the respective opening to be withdrawn in a rearward direction.

3. A receptacle according to claim 2 wherein said selector is adapted to rotate relative to said ferrule holder in order to align the opening defined by the selector with a respective opening defined by the ferrule holder.

4. A receptacle according to claim 1 wherein those portions of the openings defined by said ferrule holder that extend rearward of said ferrules are at least as large, in lateral cross-section, as the respective ferrules such that said ferrules can be readily withdrawn in a rearward direction from the respective openings.

5. A receptacle according to claim 1 further comprising means for retaining said ferrules within the respective openings defined by said ferrule holder until said withdrawing means withdraws a respective ferrule from the respective opening defined by said ferrule holder.

6. A receptacle according to claim 5 wherein said retaining means comprises:

a plurality of springs disposed within respective ones of the openings defined by said ferrule holder, each spring being disposed rearward of a respective ferrule for urging the respective ferrule toward the forward end of said receptacle body; and a spring holder disposed adjacent to and rearward of said ferrule holder for retaining said plurality of springs within the openings defined by said ferrule holder.

7. A receptacle according to claim 5 wherein said retaining means comprises a plurality of pins that extend through respective ones of the openings defined by said ferrule holder, each pin extending through a portion of a respective opening that is rearward of said ferrule disposed within the respective opening.

8. A receptacle according to claim 5 wherein said retaining means comprises a plurality of latches associated with respective ones of the openings defined by said ferrule holder, each latch being adapted to engage said ferrule disposed within the respective opening.

9. A receptacle for receiving a fiber optic connector assembly, the receptacle comprising:

a cylindrical ferrule holder extending lengthwise between opposed forward and rear ends, said ferrule holder defining a plurality of circumferentially spaced openings for receiving and holding a plurality of ferrules that mate with corresponding ferrules of the fiber optic connector assembly; and a selector adapted to rotate relative to said ferrule holder for selecting one of the plurality of openings defined by said ferrule holder from which a ferrule is to be withdrawn, wherein said rotatable selector permits the ferrule to be withdrawn in a rearward direction from the selected opening without disassembling the receptacle such that the withdrawn ferrule can be disconnected from a corresponding ferrule of the fiber optic connector assembly without disconnecting the other ferrules from the corresponding ferrules of the fiber optic connector assembly.

10. A receptacle according to claim 9 wherein said selector is disposed rearward of said ferrule holder and defines an opening that is at least as large as the size, in lateral cross-section, of the openings defined by said ferrule holder such that alignment of the opening defined by said selector with a respective opening defined by said ferrule holder permits the ferrule disposed within the respective opening to be withdrawn in a rearward direction.

11. A receptacle according to claim 9 further comprising a plurality of ferrules disposed within respective ones of the openings defined by said ferrule holder such that said ferrules are exposed through the forward end of said ferrule holder for mating with corresponding ferrules of the fiber optic connector assembly.

12. A receptacle according to claim 11 wherein those portions of the openings defined by said ferrule holder that extend rearward of said ferrules are at least as large, in lateral cross-section, as the respective ferrules such that said ferrules can be readily withdrawn in a rearward direction from the respective openings.

13. A receptacle according to claim 11 further comprising means for retaining said ferrules within the respective openings defined by said ferrule holder until said selector permits a respective ferrule to be withdrawn from the respective opening defined by said ferrule holder.

14. A receptacle according to claim 13 wherein said retaining means comprises:

a plurality of springs disposed within respective ones of the openings defined by said ferrule holder, each spring being disposed rearward of a respective ferrule for urging the respective ferrule toward the forward end of said ferrule holder; and a spring holder disposed adjacent to and rearward of said ferrule holder for retaining said plurality of springs within the openings defined by said ferrule holder.

15. A receptacle according to claim 9 further comprising a receptacle body adapted to be mounted in a fixed position, wherein said ferrule body and said selector are at least partially disposed within said receptacle body.

16. A method for selectively withdrawing a ferrule from a receptacle that is mated with a fiber optic connector assembly, the method comprising the steps of:

inserting a plurality of ferrules into respective ones of the openings defined by a ferrule holder such that said ferrules are exposed through a forward end of the receptacle;

mating the fiber optic connector assembly with the receptacle such that the plurality of ferrules exposed through the forward end of the receptacle are mated with corresponding ferrules of the fiber optic connector assembly; and withdrawing one of the plurality of ferrules in a rearward direction from the respective opening defined by the ferrule holder without disassembling the receptacle, wherein said withdrawing step comprises disconnecting the withdrawn ferrule from the corresponding ferrule of the fiber optic connector assembly without disconnecting the other ferrules from the corresponding ferrules of the fiber optic connector assembly.

17. A method according to claim 16 wherein said withdrawing step further comprises selecting one of the plurality of openings defined by the ferrule holder from which a ferrule is to be withdrawn.

18. A method according to claim 17 wherein said selecting step comprises rotating a selector relative to the ferrule holder until an opening defined by the selector is aligned with the selected opening defined by the ferrule holder such that the ferrule disposed within the selected opening can be withdrawn through the opening defined by the selector.

19. A method according to claim 16 further comprising the step of retaining the ferrules within the respective openings defined by the ferrule holder prior to said withdrawing step.

20. A method according to claim 16 further comprising the step of reinserting a ferrule into the respective opening from which the ferrule was previously withdrawn so as to mate with the corresponding ferrule of the fiber optic connector assembly.

* * * * *